United States Patent Office 3,536,747
Patented Oct. 27, 1970

3,536,747
DEHALOGENATING DIMERIZATION AND CODIMERIZATION OF β-HALOGENATED ORGANIC COMPOUNDS
Pierre Mathis, Brussels, and Leon Vanmelkebeke, Wezembeek, Oppem, Belgium, assignors to Solvay & Cie, Brussels, Belgium, a Belgian corporation
No Drawing. Filed June 7, 1967, Ser. No. 644,061
Claims priority, application France, June 9, 1966, 64,857; May 9, 1967, 105,721
Int. Cl. C07c 121/20, 121/26
U.S. Cl. 260—465.8            11 Claims

ABSTRACT OF THE DISCLOSURE

The dehalogenating dimerization and codimerization of β-halogenated organic compounds is carried out by contacting with an alkaline or alkaline earth amalgam a solution of the β-halogenated organic compounds in an organic solvent which is inert towards the amalgam under the reaction conditions and which has a high dielectric constant.

BACKGROUND OF THE INVENTION

This invention relates to a dimerization and codimerization process for the dehalogenation of β-halogenated organic compounds of the general formula $$HalCHR—CHR'X$$

in which Hal represents a halogen atom, R and R' stand for hydrogen or a hydrocarbon group and X is a nitrile or an ester group.

More particularly, the invention is directed to the dimerization and the codimerization of β-halogenated nitriles and β-halogenated propionic acid esters which may be substituted in the α-position.

The dehalogenation of a β-halogenated propionic compound by dimerization in the presence of an alkali metal or an alkaline earth metal amalgam is an application of a well known type of reaction, the Wurtz reaction. The dimerization of β-chloropropionitrile into adiponitrile by means of a potassium amalgam is described in German Pat. No. 1,151,791. Because of low yields and a low conversion rate, this process can hardly be used on an industrial basis. The rate of conversion of the β-chloropropionitrile is only about 7% per hour; the total adiponitrile yield is 37.8% and the percentage of potassium which is used for dimerizing the β-chloropropionitrile is only 23%.

The above German patent indicates that the yield may be improved by using a mixture of acrylonitrile and of a β-halogenated propionitrile. The concentrations of the two reactants in the mixture are respectively 10 to 80% molar, preferably 20 to 50%, and 20 to 90% molar, preferably 50 to 80%. In this process, the adiponitrile yield is relatively high, reaching 90.2% at the maximum, but the proportion of the active metal which is utilized is only 59% at the maximum. Furthermore, the conversion rate is very low.

SUMMARY OF THE INVENTION

A new process has now been developed in which it is possible to obtain high conversion rates and, at the same time, improved molar yields of the dimers and a rate of utilization of the active metal which is higher than 85%.

According to the invention, the dimerization and the codimerization process for the dehalogenation of β-halogenated organic compounds of the general formula $$HalCHR—CHR'—X$$

in which Hal represents a halogen atom, R and R' stand for hydrogen or a hydrocarbon group and X is a nitrile or an ester group, may be carried out by mixing an alkali metal or an alkaline earth metal amalgam with a solution of the β-halogenated organic compounds in an organic solvent which is inert towards the amalgam under the usual reaction conditions, and which has a high dielectric constant.

For example, solvents which liberate protons, such as acids, alcohols, and solvents containing halogens in their molecule are not suitable in the process according to the invention. The solvents which may be used, according to the invention, should have a reactivity lower than the β-halogenated organic compound with respect to the amalgam, in order to be inert under the conditions of operation. Through their molecular arrangement, the solvents should be capable of solvating the cations. Their dielectric constant measured at room temperature (20° C.) is generally higher than 20.

DESCRIPTION OF THE PREFERRED EMBODIMENTS

The following table is a list of typical solvents having a high dielectric constant. Among these solvents, those which are inert towards the amalgam, under the conditions of operation, may be used in the process according to the invention.

| Solvent | Inert with respect to the amalgam? | Temperature (° C.) at which ε was measured | Dielectric constant, ε |
|---|---|---|---|
| Methanol | No | 20 | 33.5 |
| Ethanol | No | 20 | 25 |
| Glycol | No | 20 | 38.5 |
| Glycerine | No | 20 | 41 |
| Furfural | Yes | 20 | 41.7 |
| Dimethylsulfate | Yes | 20 | 55 |
| Dimethylsulfoxide | Yes | 25 | 46.5 |
| Tetramethylene-sulfone | Yes | 30 | 44 |
| Nitromethane | No | 20 | 38.5 |
| Nitrobenzene | No | 20 | 35.5 |
| 2,2-dinitro-propane | No | 20 | 35 |
| Acetone | Yes | 20 | 20.5 |
| Acetamide | Yes | 20 | 59 |
| N-methylformamide | Yes | 20 | 190 |
| N,N-dimethylformamide | Yes | 20 | 37.5 |
| N-methylacetamide | Yes | 20 | 175.5 |
| N,N-dimethylacetamide | Yes | 20 | 39 |
| N-methylpropionamide | Yes | 20 | 180 |
| Epichlorhydrin | No | 22 | 22.6 |

Examples of other solvents suitable for employment according to the invention are formamide, hexamethylenephosphotriamide, and lower alkyl analogs of the methyl compounds in the foregoing table such as mono- and di-alkylacetamide.

The solvents which are particularly preferred are dimethylformamide, dimethylacetamide, formamide, dimethylsulfoxide, hexamethylphosphotriamide and tetramethylenesulfone.

It is obvious that a mixture of solvents which is inert towards the amalgam and which has a high dielectric constant could also be used in the process according to the invention.

The proportion of the solvent in the starting solution should be from 0.04 to 10 liters of solvent per mole of β-halogenated organic compound, preferably from 0.05 to 2 liters of solvent per mole.

The amalgam which is used to carry out the dimerization process, generally contains from 0.1 to 10 grams of active metal per kilogram of mercury, preferably between 0.5 to 7 g./kg. An amalgam produced by the electrolysis of alkaline halides in mercury cathode cells can be used with advantage.

With an amalgam produced by electrolysis, it is not necessary to exhaust it entirely during the dimerization process, since it may be easily reintroduced at an intermediate level in the electrolysis cell.

The conversion rate and the yields are improved by adding a small quantity of water to the reactive mixture. This quantity should be kept within narrow limits in order to prevent exhausting of the amalgam and the production of hydrogen. The quantity of water should generally be from 0.05 to 15% of the weight of the solution, preferably from 1 to 10%.

The dehalogenating dimerization reaction is carried out at the interface between the amalgam and the reactive mixture. It is recommended to increase the surface, for example, by introducing the amalgam as fine droplets. The interface may also be increased by agitating the two phases, especially the organic phase where the diffusion is slow.

The reaction temperature may vary from 0 to 150° C., preferably from 20 to 140° C. Generally, the reaction is carried out at atmospheric pressure and at a temperature below the boiling point of the solvent. The best results have been obtained at temperatures from 30 to 70° C.

The process according to the invention is particularly useful for the dimerization and the codimerization of β-halogenated propionitriles and of the esters of β-halogenated propionic acid. These compounds may be easily produced by the hydrohalogenation of the corresponding nitriles and acrylic esters. The dimers and codimers so produced are particularly useful as monomers for the production of nylons. The dehalogenating dimerization of β-halogenated propionitriles produces adiponitrile which may thereafter be hydrogenated into hexamethylene diamine or hydrolyzed into adipic acid. Both these compounds are well known monomers used for the production of nylon-6,6. On the other hand, the β-halogenated propionic acid esters are not only capable of being dimerized with the formation of adipates, which may be substituted, but may also be codimerized with other β-halogenated propionic compounds, particularly the nitriles. In this case, besides the two usual adipate and adiponitrile dimers, there is produced a predominating proportion of a mixed dimer, or of a codimer which is the ω-cyanopentanoate. This compound may be hydrolyzed into adipic acid or it may be hydrogenated into ω-aminocaproate which is a monomer used in the production of nylon-6.

β-Chloropropionitrile is a β-halogenated propionitrile which is particularly suitable to dimerization or codimerization according to the process of the invention. It may be easily produced by the addition of a molecule of hydrogen chloride to a molecule of acrylonitrile (J. Am. Chem. Soc., vol. 69, p. 713 and 714, 1947).

Similarly, a β-halogenated propionic acid ester which is particularly suitable for dimerization or codimerization, according to the process of the invention, is methyl β-chloropropionate which is easily obtained by the addition of one molecule of hydrogen chloride to methyl acrylate.

In the dimerization of the β-halogenated propionitriles, after termination of the reaction, in addition to adiponitrile and β-halogenated propionitrile which has not reacted, propionitrile and acrylonitrile are present. The production of acrylonitrile has no effect on the yield of the reaction. On the contrary, this compound may be easily recycled for the production of β-halogenated propionitrile.

It is not necessary to separate the acrylonitrile fraction which is still present in the β-halogenated propionitrile before carrying out the dimerization reaction.

It has indeed been realized that when the concentration of acrylonitrile in the reaction mixture is increased by incorporating, at the start, a small supplementary quantity of acrylonitrile which is added to the quantity which is formed during the dimerization reaction, the yields and the rate of reaction are improved. The quantity of acrylonitrile which is added to the starting reactive mixture may be from 0.001 to 1 mole per mole of β-halogenated propionitrile. Preferably, from 0.01 to 0.50 mole per mole of the halogenated nitrile is used. Moreover, it is found that the foregoing applies with respect to the addition, to the solution of any β-halogenated organic compound reacted according to the present invention, of the corresponding α,β-dehydrohalogenated compound.

The process according to the invention is preferably carried out continuously and coordinated with the production of the β-halogenated organic compound and with an electrolysis by means of a mercury cathode. There are some advantages in further coordinating these operations by having recycling stages between them.

In the dimerization of β-chloropropionitrile, when the aforementioned three processes are combined the total reaction can be written in the following manner:

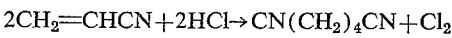

In the first stage which is the hydrochlorination of acrylonitrile, the following reaction is carried out:

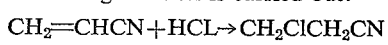

The β-chloropropionitrile is thereafter subjected to dechlorinating dimerization according to the following reaction:

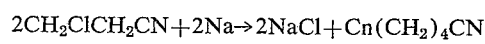

Furthermore, there is production of acrylonitrile which is recycled with the excess β-chloropropionitrile to the start of the hydrochlorination or to the start of the dimerization stage. All the sodium which is used can be recovered as sodium chloride which is recycled to the electrolysis tubs, with the result that the total process does not use sodium and produces chlorine. It is obvious that the sodium amalgam does not have to be completely exhausted if the electrolysis has a higher capacity than is necessary for regenerating the amalgam.

To summarize, starting from acrylonitrile, hydrogen chloride, electric energy and eventually heat, adiponitrile and chlorine are produced. Contrary to the usual dimerization process for hydrogenating acrylonitrile, there is no production of caustic soda.

The invention will now be further described by reference to the following examples which are intended to illustrate but not to limit the invention.

Examples 1 to 4

A number of discontinuous tests were carried out in glass cylindrical reactors all having the same height (350 mm.) but having different diameters depending on the volume of the organic phase which is introduced therein.

A sodium amalgam which is pulverized into droplets having a diameter of approximately 0.5 mm. by means of a perforated porcelain plate, is brought at the top of a reactor by means of a constant flow pump (approximately 66 kg./hour). The droplets fall freely into the reaction mixture. The amalgam having a decreased content of active metal is recovered at the bottom of the reactor and is recycled by means of the pump. The assembly is maintained at a constant temperature.

Reactive solutions having various β-chloropropionitrile, solvent and water concentrations are introduced into the reactor. The concentration and the nature of the solvent are specified in Table I. In the same table, the quantities and the concentrations in sodium in the amalgam and the temperature and duration of the reaction are also given. The tests carried out as references (comparative examples) have been numbered by a reference numeral preceded by the letter R.

The adiponitrile, β-chloropropionitrile and acrylonitrile concentrations are determined by gaseous chromatography. The results of the analysis are given in Table II. The molar quantity of β-chloropropionitrile which is converted during the reaction is considered to be equal to the molar quantity of the starting compound minus the quantity which is found intact in the end mixture, and also minus the quantity corresponding to the acrylonitrile found in the end mixture which is easily converted quantitatively into β-chloropropionitrile. This quantity is equal to twice the number of moles of adiponitrile which has been formed, increased by the number of moles of β-chloropropionitrile which has reacted for the production of non-recoverable by-products comprising, in greater part, propionitrile. The molar adiponitrile yields have been calculated keeping in mind that two moles of β-chloropropionitrile are required for the formation of one mole of adiponitrile.

According to the total quantity of sodium which has been used during the reaction, the proportion of reacted sodium which was used for the dimerization of the β-chloropropionitrile has been determined by taking into account the fact that two gram-atoms of sodium are required to produce one mole of adiponitrile.

Finally, the reaction rate has been obtained by measuring the quantity of β-chloropropionitrile converted every hour.

vention. Example 3 shows that the adiponitrile yield with respect to β-chloropropionitrile and sodium and the conversion rate are clearly improved by adding a small quantity of water in addition to the solvent.

Examples 5 to 14

A series of tests was carried out continuously in a bell-shaped reactor containing an organic phase and in which the lower part is immersed in a sodium amalgam. The area(s) of the interface is 28 cm.$^2$. The reactions at the interface are continuously renewed by means of an agitator which operates simultaneously in the amalgam and in the organic phase and which has the highest rotation speed possible without dispersing the amalgam. The inflow of the reaction mixture at the input is measured by a rotameter. The organic phase and the amalgam which are introduced continuously into the reactor are evacuated by overflow. The assembly is maintained at a constant temperature.

The input flow of the organic phase components and of the amalgam and the reaction temperature are given in Table III. The tests carried out by way of reference have been given an example number preceded by the letter R.

Table IV gives the test results. The adiponitrile molar yield is calculated by keeping in mind that two moles of β-chloropropionitrile correspond to one mole of adiponitrile and is expressed as a ratio of the quantity of adiponitrile (in moles) formed every hour and of the quantity of β-chloropropionitrile definitely converted per hour. As in the preceding examples, the acrylonitrile which is formed is considered to be recoverable.

TABLE I

| Example No. | Composition of the starting solution ||||| Sodium amalgam |||||Reaction conditions ||
| | β-Chloro-propionitrile (a) (mmole) | Identity of solvent | Solvent content (ml.) | Water content (g.) | Sodium content (g./kg.) | Weight of amalgam (kg.) | Weight of sodium (g.) | Number of g.-atoms of sodium | Temperature (° C.) | Duration (hours) |
|---|---|---|---|---|---|---|---|---|---|---|
| R1 | 1,700 | | | | 5.0 | 15.74 | 78.7 | 3.42 | 120 | 4 |
| R2 | 625 | Benzene | 196 | | 4.91 | 8.752 | 43.0 | 1.87 | 70 | 14.5 |
| 1 | 590 | Dimethylformamide | 166 | | 4.94 | 6.375 | 31.5 | 1.37 | 70 | 5 |
| 2 | 1,310 | Formamide | 310 | | 5.24 | 11.861 | 62.0 | 2.695 | 70 | 3 |
| 3 | 630 | Dimethylformamide | 177 | 11.5 | 5.13 | 6.370 | 32.6 | 1.42 | 70 | 2 |
| 4 | 630 | do | 177 | 11.5 | 4.98 | 7.344 | 36.6 | 1.59 | 40 | 3.33 |

TABLE II

| | Composition of the end solution |||||||||
| Example No. | Adiponitrile (b) (mmole) | Unchanged β-chloro-propionitrile (c) (mmole) | Acrylonitrile (d) (mmole) | β-Chloropropionitrile converted into non-recoverable by-products a−(2b+c+d) (mmole) | Total β-chloropropionitrile definitely converted a−(c+d) (mmole) | True yield of adiponitrile $\frac{2b \times 100}{a-c}$ percent | Practical yield of adiponitrile $\frac{2b \times 100}{2-(c+d)}$ percent | Sodium converted (mg.-atoms) | Adiponitrile yield with respect to sodium percent | Conversion rate, percent per hour $\frac{(a-c) \cdot 100}{a \cdot t}$ |
|---|---|---|---|---|---|---|---|---|---|---|
| R1 | 41 | 1,182 | 135 | 301 | 383 | 15.8 | 21.4 | | | 7.6 |
| R2 | 17.3 | 339 | 145 | 107 | 141 | 12.1 | 24.5 | | | 3.2 |
| 1 | 156 | 0 | 3 | 272 | 584 | 52.9 | 53.5 | 550 | 57 | 20 |
| 2 | 355.5 | 0 | 3 | 596 | 1,307 | 54.3 | 54 | 1,310 | 54 | 33.3 |
| 3 | 254.5 | 0 | 15 | 104 | 613 | 80.8 | 83 | 612 | 83 | 50 |
| 4 | 278 | 0 | 38 | 36 | 592 | 88.3 | 94 | 641 | 87 | 30 |

Reference Examples R1 and R2 show that when β-chloropropionitrile is dimerized in the absence of a solvent or in the presence of a solvent which is not in accordance with the invention, the molar adiponitrile yield and the conversion rate are low. According to Examples 1 and 2, the yields and the reaction rates are appreciably improved by the addition of a solvent according to the invention.

To calculate the rate of the molar utilization of sodium, it should be borne in mind that two gram-atoms of sodium are required for the production of one mole of adiponitrile.

The reaction rate is measured by calculating the rate of formation of adiponitrile with respect to the contact surface of the two phases.

TABLE III

| Example No. | Organic reactants introduced ||||||| Sodium amalgam at input ||||
|---|---|---|---|---|---|---|---|---|---|---|---|
| | β-Chloropropionitrile ||| Solvent || Acrylonitrile (b), mmole/hr. | Water, g./hr. | Sodium content, g./kg. | Flow of amalgam, kg./hr. | Flow of sodium, g./hr. | Flow of sodium, mg.-atoms/hr. | Temperature, (°C.) |
| | Total flow, g./hr. | (a) mmole/hr. | Identity | Flow, l./hr. | β-Chloropropionitrile quantity in l./mole | | | | | | | |
| R3 | 200 | 2,208 | Benzene | 0.170 | 0.304 | | 2.4 | 4.97 | 6,500 | 32.30 | 1,402 | 70 |
| R4 | 200 | 559 | Dimethylformamide | 0.490 | 0.284 | | | 4.94 | 6,500 | 32.10 | 1,397 | 70 |
| 5 | 618 | 1,727 | do | 0.445 | 0.256 | | | 4.85 | 6,200 | 30.05 | 1,307 | 70 |
| 6 | 600 | 1,676 | do | 0.428 | 0.256 | | 30 | 5.35 | 7,000 | 37.45 | 1,628 | 70 |
| 7 | 600 | 1,676 | do | 0.222 | 0.265 | | 45 | 5.30 | 6,250 | 33.10 | 1,439 | 40 |
| 8 | 300 | 838 | do | 0.222 | 0.265 | | 15 | 4.90 | 6,000 | 29.40 | 1,278 | 40 |
| 9 | 300 | 805 | do | 0.445 | 0.276 | | 15 | 5.05 | 6,000 | 30.80 | 1,339 | 40 |
| 10 | 600 | 1,207 | do | 0.00 | 0.368 | 57 | 30 | 4.69 | 6,400 | 30.00 | 1,304 | 40 |
| 11 | 303 | 847 | Dimethylsulfoxide | 0.193 | 0.228 | 792 | 15.1 | 4.66 | 6,300 | 30.80 | 1,279 | 70 |
| 12 | 193 | 539 | Hexamethylphosphotriamide | 0.935 | 0.251 | | 9.65 | 4.97 | 6,100 | 29.40 | 1,402 | 70 |
| 13 | 315 | 880 | Dimethylacetamide | 0.235 | 0.267 | | 15.75 | 4.88 | 6,000 | 32.30 | 1,272 | 70 |
| 14 | 605 | 1,090 | Dimethylformamide | 0.448 | 0.265 | | 30.25 | 1.00 | 14.000 | 14.00 | 608 | 70 |

TABLE IV

| Example No. | Adiponitrile output flow (c), mmole/hr. | β-Chloropropionitrile output flow (d), mmole/hr. | Acrylonitrile output flow (e), mmole/hr. | Propionitrile output flow, mmole/hr. | Theoretical yield, $\frac{2c}{a} \times 100$ (percent) | Adiponitrile practical yield $\frac{2c \times 100}{a-d-(e-b)}$ (percent) | Sodium converted (f), g.-atoms/hr. | Adiponitrile yield with respect to sodium, $\frac{2c \times 100}{f}$ (percent) | Sodium concentration of amalgam output, g.at./kg. | Adiponitrile rate of formation (c./s.), mmole/hr.·cm.² |
|---|---|---|---|---|---|---|---|---|---|---|
| R3 | 3 | 2,129 | 40 | 23.5 | 7.5 | 20 | | | 0.193 | 0.89 |
| R4 | 0.2 | 481 | 15.5 | 6 | 0.5 | ~0.5 | | | 0.186 | 3.89 |
| 5 | 25 | 1,543 | 41 | 23.5 | 27.2 | 68 | 108 | 46.5 | 0.153 | 6.18 |
| 6 | 109 | 1,344 | 70 | 43 | 65.5 | 83 | 320 | 66 | 0.188 | 2.29 |
| 7 | 173 | 1,193 | 75 | 61.5 | 71.6 | 85 | 486 | 71.5 | 0.165 | 5.21 |
| 8 | 64 | 674 | 21 | 15 | 78.1 | 80 | 151 | 85 | 0.104 | 9.18 |
| 9 | 146 | 481 | 78 | 11.5 | 91.4 | 96 | 331 | 88 | 0.145 | 4.69 |
| 10 | 257 | 682 | 792 | 10.5 | | 98 | 644 | 80 | 0.197 | 1.50 |
| 11 | 132 | 524 | 38 | 21.5 | 82.4 | 92 | 365 | 72.5 | 0.177 | 2.43 |
| 12 | 42 | 407 | 33 | 15.5 | 63.6 | 80 | 119.5 | 70 | 0.034 | 0.61 |
| 13 | 68 | 686 | 32.5 | 26 | 70.1 | 84 | 211.5 | 64.5 | | |
| 14 | 17 | 1,587 | 47 | 22 | 33.0 | 61 | 134 | 25.5 | | |

Example 5 shows that the addition of a solvent according to the invention (in this case, dimethylformamide) to β-chloropropionitrile increases the molar yield of adiponitrile with respect to β-chloropropionitrile and sodium. It can be seen from Examples 6, 11, 12 and 13 that by adding a small quantity of water, the results are further improved. Finally, further improved results may be obtained by adding acrylonitrile (Example 9). If the proportion of acrylonitrile is increased in the input mixture, the practical yield of adiponitrile with respect to the chloropropionitrile and the reaction rate are improved but the adiponitrile yield with respect to sodium is decreased (Example 10). The sodium content of the amalgam (Example 14) and the temperature (Examples 8 and 9) may vary widely.

Example 15

Under conditions similar to those employed in Examples 5 to 14, there was carried out a test wherein the active metal of the amalgam is potassium. The reaction temperature is 70° C. The input mixture comprises 1660 mmoles of β-chloropropionamide, 441 ml. of dimethylformamide and 29.75 g. of water. The flow of solvent is 0.441 l./hr. or 0.265 l./mole of β-chloropropionitrile and the total flow of organic reactants is 595 g./hr. The flow of amalgam is 6.240 kg./hour. The amalgam contains 5.12 g. of potassium per kg. The flow of potassium is therefore 32 g./hour or 817 mg.-atoms/hour.

At the output, there are obtained 54.5 moles of adiponitrile, 39 mmoles of acrylonitrile, 1483 mmoles of β-chloropropionitrile and 29 mmoles of propionitrile per hour. The theoretical yield of adiponitrile is 61.7% and the practical yield is 79.0%. These yields are calculated as in Examples 5 to 14. The yield with respect to potassium is calculated by bearing in mind that the 234.5 mg.-atoms of potassium used per hour should have formed 117 mmoles of adiponitrile. The yield is therefore 46.5%. The concentration of potassium in the amalgam at the output is 0.094 g.-atoms per kg., and the formation rate of adiponitrile is 1.95 mmole/hr.·cm.²

Example 16

Under conditions identical to those employed in Examples 5 to 14, a test was carried out wherein the substance to be dimerized is a β-halogenated propionic ester.

Every hour there was introduced a mixture comprising 366 mmoles of methyl β-chloropropionate, 77 mmoles of methyl acrylate, 1222 mmoles of dimethylformamide and 6.78 g. of water, which corresponds to a flow of solvent of 0.094 l./hr., that is 0.256 l./mole of methyl β-chloropropionate.

The total flow of organic reactants is 147.5 g./hr. The flow of amalgam is 1.542 kg./hr. The amalgam contains 5.60 g. of sodium per kg. The flow of sodium is therefore 8.64 g./hr. or 376 mg.-atoms/hr.

The reaction is carried out at 40° C.

Every hour there is produced a liquid containing 155 mmoles of dimethyl adipate, 50 mmoles of methyl β-chloropropionate, 50 mmoles of methyl acrylate and 6 mmoles of methyl propionate.

The theoretical molar yield (calculated with respect to the converted β-chloropropionate) in dimethyl adipate is 98%, and the practical calculated yield, bearing in mind that the acrylate has also reacted, is 90.3%.

The dimer yields with respect to the sodium which has reacted are very close to 100%.

Example 17

Under conditions identical to those employed in Examples 5 to 14, a test was carried out in which the β-halogenated propionitrile was codimerized with an ester of a β-halogenated propionic acid.

The reaction temperature was 40° C.

Every hour there was introduced a mixture comprising 183.4 mmoles of methyl β-chloropropionate, 157.7 mmoles of β-chloropropionitrile, 33 mmoles of methyl acrylate, 27 mmoles of acrylonitrile, 70 mmoles of dimethylformamide and 5.24 g. of water. The corresponding flow of solvent is 0.070 l./hr., and the total flow of organic reactants is 112.7 g./hr. The flow of amalgam is 1.997 kg./hr. The amalgam contains 5.62 g. of sodium/kg. The flow of sodium is therefore 11.22 g./hr. or 488 mg.-atoms/hr.

Every hour there is produced a mixture containing 92.5 mmoles of methyl cyanopentanoate, 218 mmoles of adiponitrile, 15.3 mmoles of dimethyl adipate, 41 mmoles of methyl β-chloropropionate, 13 mmoles of β-chloropropionitrile, 13.7 mmoles of acrylonitrile and 21.4 mmoles of methyl acrylate.

The theoretical yields calculated with respect to the two β-chlorinated reactants are 62.0% of methyl cyanopentanoate, 14.6% of adiponitrile and 10.3% of dimethyl adipate or a total yield of 86.9%.

The practical molar yields calculated by bearing in mind that all the reactants have reacted are respectively 57.4% of methyl cyanopentanoate, 13.6% of adiponitrile and 9.5% of dimethyl adipate or a total of 80.5%.

The yield for the three dimers calculated with respect to sodium is nearly quantitative.

What we claim and desire to secure by Letters Patent is:

1. In a dechlorinating dimerization process for dechlorinating β-chloro organic compounds having the formula ClCHR—CHR'X, in which R and R' each are a hydrogen or an alkyl group and X is a nitrile or a carboxylic acid alkyl ester group, by reacting said compounds with an amalgam selected from the group consisting of alkali metal and alkali earth metal amalgams, the improvement comprising carrying out the reaction by contacting the amalgam with a solution of said β-chloro organic compounds in an organic solvent selected from a member of the group consisting of furfural, dimethylsulfate, dimethylsulfoxide, tetramethylenesulfone, acetamide, formamide, N-methylformamide, N,N-dimethylformamide, N-methylacetamide, N,N-dimethylacetamide, N-methylpropionamide, hexamethylenephosphortriamide and mixtures thereof.

2. Process according to claim 1, in which the β-chloro compound is β-chloro-propionitrile which contains from 0.001 to 1 mole of acrylonitrile per mole of β-chloropropionitrile.

3. Process according to claim 1, in which the solvent is dimethylformamide.

4. Process according to claim 1, in which the solvent is dimethylsulfoxide.

5. Process according to claim 1, in which the β-chloro organic compound is β-chloropropionitrile.

6. Process according to claim 1, in which the β-chloro organic compound is methyl β-chloropropionate.

7. Process according to claim 1, in which the quantity of the solvent is from 0.04 to 10 liters per mole of the β-chloro organic compound.

8. Process according to claim 7, in which the quantity of the solvent is from 0.05 to 2 liters per mole of the β-chloro compound.

9. Process according to claim 1, in which the organic solvent solution of the β-chloro organic compound contains water in a quantity of 0.05 to 15% by weight based on the total weight of the solution.

10. Process according to claim 9, in which the quantity of the water is from 1 to 10% of the total weight of the solution.

11. Process according to claim 2, in which the quantity of the acrylonitrile is from 0.01 to 0.50 mole per mole of the β-chlorinated propionitrile.

References Cited

UNITED STATES PATENTS 3,215,726  11/1965  Sennewald et al. ____ 260—465.4
3,356,708  12/1967  Davies et al. _____ 260—465.8

FOREIGN PATENTS 1,436,896  3/1966  France.

JOSEPH P. BRUST, Primary Examiner

U.S. Cl. X.R.

260—465.1, 465.4 465.7, 465.9, 485